(12) United States Patent
Kallio et al.

(10) Patent No.: US 6,380,332 B1
(45) Date of Patent: Apr. 30, 2002

(54) ACTIVATOR SYSTEM FOR METALLOCENE COMPOUNDS

(75) Inventors: Kalle Kallio, Vanhakylä ; Hilkka Knuuttila, Porvoo; Kaisa Suominen, Tampere, all of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/355,309

(22) PCT Filed: Jan. 27, 1998

(86) PCT No.: PCT/FI98/00076

§ 371 Date: Sep. 23, 1999

§ 102(e) Date: Sep. 23, 1999

(87) PCT Pub. No.: WO98/32775

PCT Pub. Date: Jul. 30, 1998

(30) Foreign Application Priority Data

Jan. 28, 1997 (FI) .................................................. 970349

(51) Int. Cl.$^7$ ................................ C08F 4/16; C08F 4/58
(52) U.S. Cl. ........................ 526/128; 526/160; 526/943; 502/104; 502/117; 502/152
(58) Field of Search ................................ 502/103, 104, 502/117, 118, 152; 526/128, 160, 943

(56) References Cited

U.S. PATENT DOCUMENTS

| | | | |
|---|---|---|---|
| 4,665,208 A | 5/1987 | Welborn, Jr. et al. | 556/179 |
| 4,874,734 A | * 10/1989 | Kioka et al. | 502/104 |
| 4,908,463 A | 3/1990 | Bottelberghe | 556/179 |
| 4,924,018 A | 5/1990 | Bottelberghe | 556/179 |
| 4,952,540 A | 8/1990 | Kioka et al. | 502/9 |
| 4,968,827 A | 11/1990 | Davis | 556/179 |
| 5,006,500 A | 4/1991 | Chande | |
| 5,091,352 A | 2/1992 | Kioka et al. | 502/103 |
| 5,103,031 A | 4/1992 | Smith, Jr. | 556/179 |
| 5,157,137 A | 10/1992 | Sangokoya | 556/179 |
| 5,204,419 A | 4/1993 | Tsutsui et al. | 526/173 |
| 5,206,199 A | 4/1993 | Kioka et al. | 502/117 |
| 5,235,081 A | 8/1993 | Sangokoya | 556/179 |
| 5,248,801 A | 9/1993 | Sangokoya | 556/179 |
| 5,308,815 A | 5/1994 | Sangokoya | 502/104 |
| 5,329,032 A | 7/1994 | Tran et al. | 556/179 |

FOREIGN PATENT DOCUMENTS

| | | |
|---|---|---|
| EP | 03 84171 | 8/1990 |
| EP | 0575875 B1 | 6/1993 |
| EP | 0 575 875 B1 * | 12/1993 |
| EP | 0577581 A2 | 1/1994 |
| EP | 0589364 A2 | 3/1994 |
| EP | 279586 B1 | 5/1994 |
| EP | 320762 B1 | 3/1996 |
| EP | 9623006 | 8/1996 |
| EP | 0737694 A1 | 10/1996 |
| EP | 0748822 A3 | 12/1996 |
| EP | 594218 B1 | 3/1999 |
| EP | 561476 B1 | 9/1999 |
| FI | 932802 | 12/1991 |
| WO | 9105810 | 5/1991 |
| WO | 9410180 | 5/1994 |
| WO | 9600243 | 1/1996 |
| WO | 9627621 | 9/1996 |

OTHER PUBLICATIONS

J Am chem Soc 117 (1995) 6465–6474 Harlan et al "Three coordinate aluminum is not a prerequisite for catalytic activity in the zirconocene–alumoxane . . . ".

Polymer Bulletin 36 (1996) 317–323 Reddy "A comparative study of tetraisobutyldialuminoxane and methylaluminoxane . . . ".

Polymer Reaction Engineering 3(2) (1995) 131–200 Soares et al "Metallocene aluminoxane catalysts for olefin polymerization. A review".

Japanese Abstract: JPA51–55926, Jun. 22, 1993.

Japense Abstract: JPA7–0337814, Feb. 3, 1995.

* cited by examiner

*Primary Examiner*—David W. Wu
*Assistant Examiner*—R. Harlan
(74) *Attorney, Agent, or Firm*—Birch, Stewart, Kolasch & Birch, LLP

(57) ABSTRACT

Aluminoxanes having $C_2$–$C_{10}$ alkyl groups can conveniently be used in supported olefin polymerization catalyst compositions prepared by contacting a support comprising a solid compound which is one of pure aluminium oxide, a mixed aluminium oxide, an aluminium salt, a magnesium halide, or a $C_1$–$C_8$ alkoxy magnesium halide, in any order with at least a) an organometallic compound, b) a metallocene, and c) an aluminoxane, and recovering said supported olefin polymerization catalyst composition.

45 Claims, No Drawings

ACTIVATOR SYSTEM FOR METALLOCENE COMPOUNDS

The present invention relates to a process for the preparation of a supported olefin polymerization catalyst composition, comprising a support, a metallocene, and an aluminoxane. The invention also relates to a supported olefin polymerization catalyst composition which has been prepared according to said process and to the use of such a supported olefin polymerization catalyst composition for the polymerization of at least one olefin.

In many olefin polymerization processes using a single site catalyst, it is desirable to support the catalyst on a carrier or support. Usually such supported catalyst compositions include a metallocene and an aluminoxane supported on an inorganic oxide carrier such as silica and/or alumina.

For example, WO 96/00243 describes a method for producing a supported catalyst composition by mixing a bridged bis-indenyl metallocene and an aluminoxane in a solvent to form a solution, and then combining the solution and a porous support, whereby the total volume of the solution is less than that at which a slurry is formed. A typical support used was previously heated silica MS 948 (Grace) and a typical aluminoxane used was gel-free methyl aluminoxane (MAO), both of which were used in all of the examples.

According to S. Srinvasa Reddy, Polymer Bulletin, 36 (1996) 317–323, the ethylene polymerization activity of tetraisobutyldialuminoxane cocatalyst was clearly lower than the activity of methylaluminoxane cocatalyst. This reflects the previous general opinion, that only methyl aluminoxane as a cocatalyst gave satisfactory ethylene polymerization catalyst activities.

The purpose of the present invention is to replace MAO as an olefin polymerization procatalyst. More specifically, the present invention aims at providing an olefin polymerization catalyst composition including a higher $C_2$–$C_{10}$ alkyl aluminoxane, which has commercially satisfactory activity when producing olefin homopolymers and copolymers. A further goal of the present invention is a supported olefin polymerization catalyst composition for use in gas phase, slurry phase or liquid/solution phase polymerizations.

The above mentioned purposes of the invention have now been realized by a novel process for the preparation of a supported olefin polymerization catalyst composition, comprising a support, a metallocene, and an aluminoxane. The claimed process is mainly characterized by contacting a support comprising a solid compound which is one of an aluminium oxide, a mixed aluminium oxide such as silica-alumina, an aluminium salt, a magnesium halide or a $C_1$–$C_8$ alkoxy magnesium halide, in any order with at least a) an organometallic compound of the general formula (1):

$$R_1MX_{v-1} \qquad (1)$$

wherein each R is the same or different and is a $C_1$–$C_{10}$ alkyl group; M is a metal of Group 1, 2, 12 or 13 of the Periodic Table (IUPAC 1990); each X is the same or different and one of a halogen atom, a hydrogen atom, a hydroxyl radical or a $C_1$–$C_8$ hydrocarbyloxy group; l is 1, 2 or 3; v is the oxidation number of the metal M, b) a metallocene of the general formula (2):

$$(CpY)_m M'X'_n Z_o \qquad (2)$$

wherein each CpY is the same or different and is one of a mono- or polysubstituted, fused or non-fused, homo- or heterocyclic cyclopentadienyl, indenyl, tetrahydroindenyl, fluorenyl, or octahydrofluorenyl ligand, the ligand being covalently substituted at its cyclopentadienyl ring with at least one substituent Y which is one of a —OR', —SR', —NR'$_2$, —C(H or R')=, or —PR'$_2$ radical, each R' being the same or different and being one of a $C_1$–$C_{16}$ hydrocarbyl group, a tri-$C_1$–$C_8$ hydrocarbyl silyl group or a tri-$C_1$–$C_8$ hydrocarbyloxy silyl group; M' is a transition metal of Group 4 of the Periodic Table and bound to the ligand CpY at least in an $\eta_5$ bonding mode; each X' is the same or different and is one of a hydrogen atom, a halogen atom, a $C_1$–$Ck_8$ hydrocarbyl group, a $C_1$–$C_8$ hydrocarbylheteroatom group or a tri-$C_1$–$C_8$ hydrocarbylsilyl group or two X' form a ring with each other; Z is a bridge atom or group between two CpY ligands or one CpY ligand and the transition metal M'; m is 1 or 2; o is 0 or 1; and n is 4–m if there is no bridge Z or Z is a bridge between two CpY ligands or n is 4–m–o if Z is a bridge between one CpY ligand and the transition metal M', and c) an aluminoxane of the following general formulas (3):

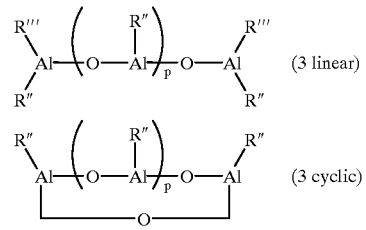

(3 linear)

(3 cyclic)

(3 general)

wherein each R" and each R''' is the same or different and is a $C_2$–$C_{10}$ alkyl group; and p is an integer between 1 and 40, and recovering said supported olefin polymerization catalyst composition.

By mono- or polysubstituted is meant that, in addition to said substituent Y, there may optionally be other substituents at the rings at said ligands CpY.

By fused or non-fused is meant that any ring at said ligands may be fused or non-fused, i.e. have at least two atoms in common, with at least one further ring.

By homo- and heterocyclic is meant that any ring of said ligands may have only carbon ring atoms (homo- or isocyclic) or may have other ring atoms than carbon (heterocyclic).

It has thus been realized that a $C_2$–$C_{10}$ alkyl aluminoxane (i.e. a non-methyl aluminoxane) can successfully be used as the cocatalyst, if a support comprising an aluminium pure oxide, mixed oxide or salt, or a magnesium halide, is first treated with a metal alkyl compound and then activated with a metallocene having a —OR', —SR', —NR'$_2$, —C(H or R')=, or —PR'$_2$ substituent at the cyclopentadienyl ring.

According to non-limiting model, said electron pair of double bond substituents at the cyclopentadienyl ring delocalize it's negative charge and help to ionise the metallocene, whereby the transition metal M becomes more cationic (electron density deficient). By combining this with special metyl alkyl treatment of acidic surfaces (like alumina, aluminium phosphate, silica-alumina, etc.) the cationisation can be enhanced. This improves the catalytic interaction between the metallocene and the aluminoxane and enables the use of higher aluminoxanes like those of the above formula (3).

Generally, said support can be contacted with compounds a), b) and c) in any order. Thus, the support can e.g. be impregnated with a solution of the three compounds a), b) and c), first with compound a) and then with a solution containing compound b) and compound c), or preferably, contacting said support at first with a) said organometallic compound of the general formula (1), then with b) said metallocene of the general formula (2), and after that with c) said aluminoxane of the general formulas (3).

According to one embodiment of the invention, the contacting of the support with compounds a), b) and c) takes place by contacting the support with one or several solutions of the compounds. The support can, for example, be contacted with a solution of said organometallic compound (1) and thereafter with a solution containing said metallocene (2) and said aluminoxane (3). In a preferable embodiment of the invention, the contacting takes place by $a_1$) contacting said support with a solution of said organometallic compound (1), and removing the supernatant from the contacting product, $b_1$) contacting the product of step $a_1$) with a solution of said metallocene (2), and removing the supernatant from the contacting product, and $c_1$) contacting the product of step $b_1$) with a solution of said aluminoxane (3), and removing the supernatant from the contacting product.

When contacting said support with compounds a), b) and c) in liquid form such as the form of a solution, a slurry or a non-slurry contacting product can be formed. However, it is preferable to impregnate the support with a liquid, the volume of which is less than at which a slurry is formed. This means that the volume of said liquid is less than or approximately equal to the volume of the support pores.

The support used in the process of the present invention is a support comprising a solid compound which is one of a pure aluminiumoxide, a mixed aluminiumoxide, an aluminium salt, a magnesium halide or a $C_1$–$C_8$ alkoxy magnesiumhalide. A typical aluminium salt is aluminium phosphate $AlPO_4$. According to preliminary experiments pure silica did not give high activity olefin polymerization catalysts when combined with a $C_2$–$C_{10}$ alkyl aluminoxane according to formula (3) and a metallocene according to formula (2). In the claimed process, however, the support comprising, i.e. consisting of, containing, or having carried thereupon said solid compound, gives high activity with compounds (2) and (3). It is believed (non-limiting) that the supports listed above are more acidic than silica and, thanks to their nature as Lewis-acids, contribute to the activation of said metallocenes and said higher aluninoxanes. The material carrying said compound can be any inert particulate material, including silica. The most preferable support comprises a porous aluminium oxide, most preferably alumina, which has been heated to a temperature between 100–1000° C. The aluiminium oxide, preferably the calcined alumina, is preferentially in the form of, or deposited on, particles having a diameter of between 10–500 μm, most preferably between 20 and 200 μm. The specific surface area of the aluminium oxide or calcined alumina is according to one embodiment of the invention between 50 and 600 $m^2/g$, preferably between 100 and 500 $m^2/g$. The average pore volume is usually between 0.5 and 5.0 ml/g, preferably between 1.0 and 2.5 ml/g. The average pore diameter is for example 100–500 Å, preferably approximately 200 Å.

According to the process of the present invention, the support is contacted with a) an organometallic compound of the general formula (1):

$$R_lMX_{v-l} \qquad (1)$$

wherein each R is the same or different and is a $C_1$–$C_{10}$ alkyl group; M is a metal of Group 1, 2, 12 or 13 of the Periodic Table; each X is the same or different and one of a halogen, a hydrogen atom, a hydroxyl radical or a $C_1$–$C_8$ hydrocarbyloxy group; l is 1, 2 or 3; and v is the oxidation number of the metal M.

According to a non-limiting theoretical model, the organometallic compound alkylates said solid compound of the support, which in turn alkylates and activates the metal of the metallocene. This is then reflected in the successful use of otherwise poorly active higher aluminoxanes.

The $C_1$–$C_{10}$ alkyl group R of formula (1) is preferably a $C_1$–$C_6$ alkyl group and most preferably a $C_1$–$C_4$ alkyl group. When defining M by means of the Groups and Periods of the Periodic Table, the new numbering system is used (IUPAC 1990). Preferred metals M are those of Periods 1–4 of the Periodic Table.

If occuring, X of formula (1) is a halogen atom, a hydrogen atom, a hydroxyl radical or a hydrocarbyloxy group. According to one preferable embodiment of the invention, said support is contacted with a) said organometallic compound of the general formula (1), which is one of a $C_1$–$C_{10}$ alkyl lithium, a $C_1$–$C_{10}$ dialkyl magnesium, or a $C_1$–$C_{10}$ trialkyl aluminium, and most preferably is a $C_1$–$C_6$ trialkyl aluminium such as trimethyl aluminium (TMA). When contacting said support with said organometallic compound, it is preferable if the organometallic compound of the formula (1) is immersed or dissolved in a hydrocarbon medium, most preferably a $C_4$–$C_{10}$ hydrocarbon medium. The weight ratio between the added organometallic compound, calculated as trimethyl aluminium, and the support depends on the surface area, pore volume and diameter, surface hydroxyl number and type. According to one embodiment it is between 0.1 and 10, more preferably between 0.2 and 2 and most preferably between 0.3 and 1.5. After the contacting step the remaining unreacted organometallic compound is preferably removed together with the possible hydrocarbon medium, followed by optional washing steps.

According to the process of the present invention said support is contacted with b) a metallocene of the general formula (2). It is preferred that the metallocene of the general formula (2) as group R' of said substituent Y has a tri-$C_1$–$C_8$ hydrocarbyl silyl or tri-$C_1$–$C_8$ hydrocarbyloxy silyl group. Especially suitable tri-$C_1$–$C_8$ hydrocarbylsilyl groups are those capable of π interaction with said O, S, N, or P atoms of Y. Most preferred are tri-$C_1$–$C_8$ alkyl silyl groups, wherein at least one of the $C_1$–$C_8$ alkyls is a branched $C_3$–$C_8$ alkyl group such as isopropyl, isobutyl, sec-butyl, tert-butyl, isoamyl, sec-amyl, tert-amyl, isohexyl, sec-hexyl, or tert-hexyl. Cyclic alkyls and aryls are also preferred groups of the silicone atom.

According to one embodiment of the invention there is only one ligand CpY in the metallocene of formula (2), which preferably is bound to the transition metal M' by both said $\eta_5$ bond and by a bridge Z preferably containing a heteroatom.

However, said metallocene of the general formula (2) has most preferably two ligands CpY, i.e. m is 2. According to a still more preferred embodiment, the two CpY ligands are bridged with each other by a bivalent atom or group Z having at least one chain atom which is one of a carbon, silicon, oxygen, sulphur, nitrogen, or phosphorous atom. Most preferably, the metallocene of the general formula (2) has m=2, whereby Z is an ethylene or a silylene bridge.

The transition metal M' of group 4 of the Periodic Table in the general formula (2) is Ti, Zr or Hf, more preferably Zr or Hf, and most preferably Zr. The valency or oxidation number of M' is 4.

In the definition of Y above, a heteroatom means —O—, —S—,

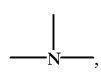

or

The preferable atom or group X' of said metallocene of formula (2) is a halogen atom and/or a $C_1$–$C_8$ hydrocarbyl group. Most preferably, X' is chlorine and/or methyl. The number of X' atoms or groups, i.e. "n", is preferably 1–3, most preferably 2, considering the limitation given above for the case when Z is a bridge between CpY and M'.

Particularly preferred metallocenes of the general formula (2) are compounds of following structural formula (4).

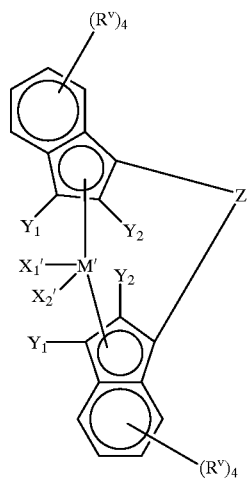

(4)

wherein $Y_1$ and $Y_2$ are the same or different and are one of a hydrogen atom, a halogen atom, an acyl group, an acyloxy group, a $C_1$–$C_{10}$ hydrocarbyl group, a —OR', —SR', —NR', —C(H or R')=, or —PR'$_2$ radical, R' being one of a $C_1$–$C_{16}$ hydrocarbyl group or a tri-$C_1$–$C_8$-hydrocarbylsilyl group, provided that at least one of $Y_1$ and $Y_2$ is one of said —OR', —SR', —NR', —C(H or R')=, or —PR'$_2$ radicals; Z is a bivalent atom or group having at least one chain atom which is one of a carbon, silicon, oxygen, sulphur, nitrogen or phosphorus atom, preferably 1–4 carbon and/or silicon chain atoms; each $R^v$ is the same or different and is one of a hydrogen atom, a halogen atom, a $C_1$–$C_{10}$ hydrocarbyl or ring constituent, or a $C_1$–$C_{10}$ hydrocarbyloxy group. M' is one of Ti, Zr or Hf; and $X_1'$ and $X_2'$ are the same or different and are one of a halogen atom and a $C_1$–$C_8$ hydrocarbyl group. The analogous 4,5,6,7-tetrahydroindenyl derivatives are also useful in the invention.

A representative metallocene of the formula (2) is ethylene-bis(2-tert-butyldimethyl-siloxyindenyl)zirconium dichloride.

When using chiral metallocenes, they can be used as a racemate for the preparation of highly isotactic α-olefin polymers. The pure R or S form of said metallocene can also be used, e.g. for the production of optically active polymer.

The metallocene of the general formula (2) is usually prepared by a process involving repeated deprotonations/metallizations of the aromatic ligands and introduction of the bridge Z atom or atoms as well as the central atom by their halogen derivatives. The preparation of the said metallocene of the general formula (2) can e.g. be carried out according to a J. Organometallic Chem. 288 (1958) 63–67 and EP-A-320762, both herewith incorporated by reference.

The most preferred metallocenes of the general formula (2), wherein Y is a tri-$C_1$–$C_8$ hydrocarbylsiloxy group, is preferably prepared as follows:

The catalyst compounds according to the invention can be prepared from 2-indanone. This compound can be reacted in a suitable solvent with a base and a chlorosilane to form 2-siloxyindene with a yield of over 80%. Suitable solvents are for example dimethylformamide (DMF) and tetrahydrofurane (THF). Suitable bases are for example imidazole and triethylamine (TEA). Suitable chlorosilanes are for example tert-butyldimethylchlorosilane, t-hexyldimethylchlorosilane and cyclohexyldimethylchlorosilane. The reaction takes place according to the following reaction scheme (II):

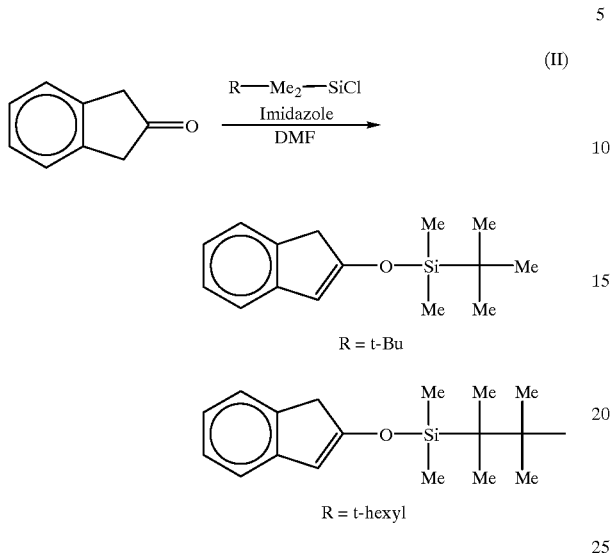

According to one embodiment of the invention 2-tert-butyldimethylsiloxyindene is reacted first with butyllithium and then with dimethyl dichlorosilane (Me$_2$SiCl$_2$) to form dimethylsilylbis(2-tert-butyldimethylsiloxyindene). Butyllithium can be replaced with methyllithium, sodium hydride or potassium hydride. Likewise dimethyl dichlorosilane can be replaced with any dialkyl or diarylsilane. Silicon can be replaced with germanium.

Dimethylsilylbis(2-tert-butyldimethylsiloxyindene) can be reacted with butyllithium, which gives the corresponding bislithium salt. This product can be reacted with zirconium tetrachloride to yield dimethylsilylbis(2-tert-butyldimethylsiloxyindenyl)zirconium dichloride as a mixture of the racemic and meso diastereomers. Butyllithium may be replaced as described earlier. Zirconium tetrachloride can be replaced with titanium tetrachloride or hafnium tetrachloride to give the corresponding titanium and hafnium complexes. The reactions take place according to the following reaction schemes (III–IV):

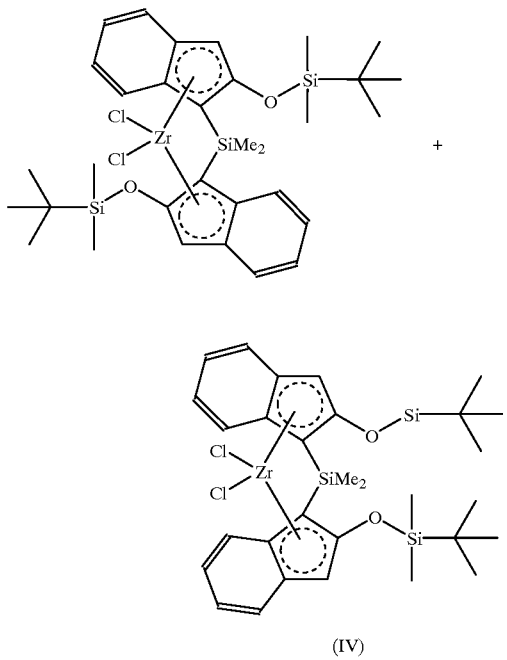

According to another embodiment of the invention 2-tert-butyldimethylsiloxyindene is reacted first with butyllithium and then with dibromoethane to form bis(2-tert-butyldimethylsiloxyindenyl)ethane. This compound can be reacted with two equivalents of butyllithium, which gives the corresponding bislithium salt. This can then be reacted with zirconium tetrachloride to yield ethylenebis(2-tert-butyldimethylsiloxyindenyl)zirconium dichloride. The racemic diastereomer of the latter is formed in great excess and is easily separated from the meso isomer by fractional crystallization. Catalytic hydrogenation of racemic ethylenebis(2-tert-butyldimethylsiloxyindenyl)zirconium dichloride yields the corresponding tetrahydroindenyl complex. The reaction takes place according to the following reaction scheme (V):

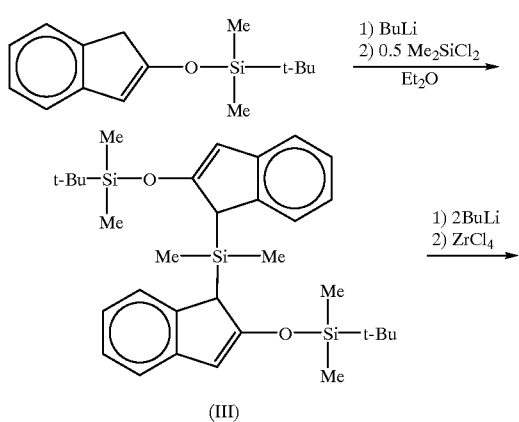

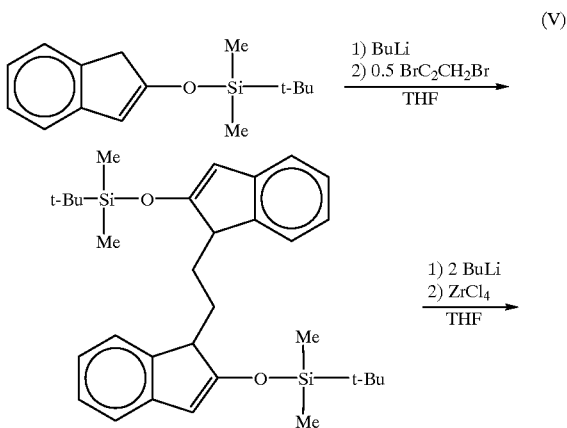

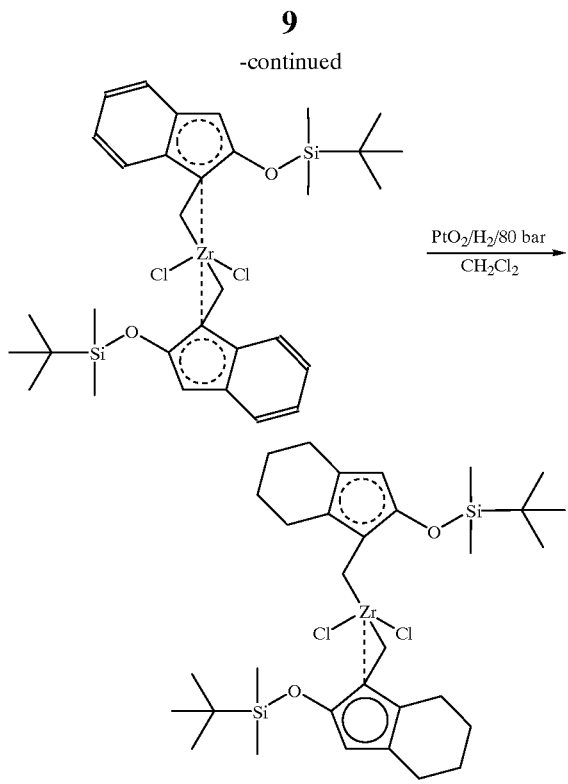

In the reactions above butyllithium may be replaced as described earlier. Zirconium tetrachloride can be replaced with titanium tetrachloride or hafnium tetrachloride to give the corresponding titanium and hafnium complexes.

According to still another embodiment of the invention 2-t-hexyldimethylsiloxyindene is reacted first with butyllithium and then with dibromoethane to form bis(2-t-hexyldimethylsiloxyindenyl)ethane. This compound can be reacted with two equivalents of butyllithium which gives the corresponding bislithium salt. This can then be reacted with zirconium tetrachloride to yield ethylenebis(2-t-hexyldimethylsiloxyindenyl)zirconium dichloride. The racemic diastereomer of the latter is formed in great excess and is easily separated from the meso isomer by fractional crystallization. The reaction takes place according to the following reaction scheme (VI):

(VI)

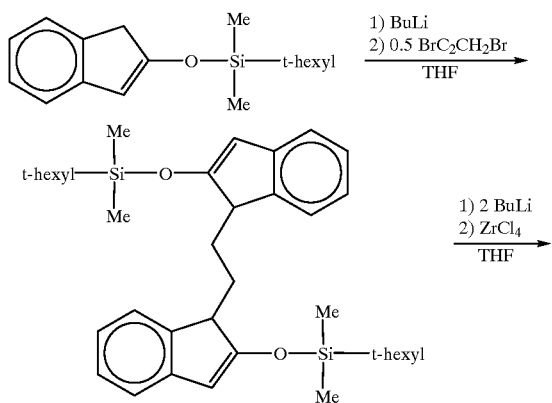

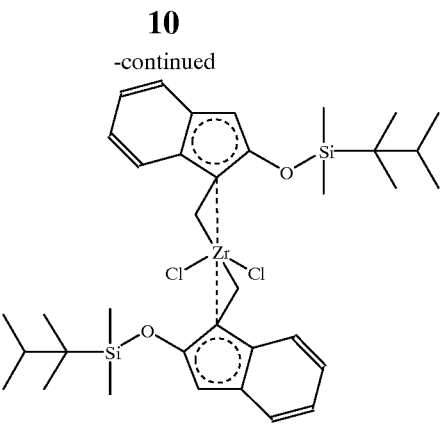

In the reactions above butyllithium may be replaced as described earlier. Zirconium tetrachloride can be replaced with titanium tetrachloride or hafnium tetrachloride to give the corresponding titanium and hafnium complexes. Hydrogenation of ethylenebis(2-t-hexyldimethylsiloxyindenyl)zirconium dichloride yields the corresponding tetrahydroindenyl complex.

Illustrative but non-limiting examples of the preferable compounds used according to the invention are, among others, racemic and meso dimethylsilylbis(2-tert-butyldimethylsiloxyindenyl)zirconium dichloride, racemic and meso diphenylsilylbis(2-tert-butyldimethylsiloxyindenyl)zirconium dichloride, racemic and meso dimethylsilylbis(2-t-hexyldimethylsiloxyindenyl)zirconium dichloride, racemic and meso diphenylsilylbis(2-t-hexyldimethylsiloxyindenyl)zirconium dichloride, racemic and meso dimethylsilylbis(2-cyclohexyldimethylsiloxyindenyl)zirconium dichloride, racemic and meso dimethylsilylbis(2-cyclohexyldimethysiloxyindenyl)zirconium dichloride, racemic and meso dimethylsilylbis(2-2-tert-butyldiphenylsiloxyindenyl)zirconium dichloride, racemic and meso diphenylsilylbis(2-tert-butyldiphenylsiloxyindenyl)zirconium dichloride, racemic and meso dimethylsilylbis(2-tert-butyldimethylsiloxy-4,5,6,7-tetrahydroindenyl)zirconium dichloride, racemic and meso diphenylsilylbis(2-tert-butyldimethylsiloxy-4,5,6,7-tetrahydroindenyl)zirconium dichloride, racemic and meso dimethylsilylbis(2-t-hexyldimethylsiloxy-4,5,6,7-tetrahydroindenyl)zirconium dichloride, racemic and meso diphenylsilylbis(2-t-hexyldimethylsiloxy-4,5,6,7-tetrahydroindenyl)zirconium dichloride, racemic and meso dimethylsilylbis(2-cyclohexyldimethylsiloxy-4,5,6,7-tetrahydroindenyl)zirconium dichloride, racemic and meso diphenylsilylbis(2-cyclohexyldimethylsiloxy-4,5,6,7-tetrahydroindenyl)zirconium dichloride, racemic and meso dimethylsilylbis(2-tert-butyldiphenylsiloxy-4,5,6,7-tetrahydroindenyl)zirconium dichloride, racemic and meso diphenylsilylbis(2-tert-butylphenylsiloxy-4,5,6,7-tetrahydroindenyl)zirconium dichloride, rac-ethylenebis(2-tert-butylmethylsiloxyindenyl)zirconium dichloride, racemic and meso ethylenebis(2-t-hexyldimethylsiloxyindenyl)zirconium dichloride, racemic and meso ethylenebis(2-cyclohexyldimethylsiloxyindenyl)zirconium dichloride, racemic and meso ethylenebis(2-tert-butyldiphenylsiloxyindenyl)zirconium dichloride, rac-ethylenebis(2-tert-butyldimethylsiloxy-4,5,6,7-tetrahydroindenyl)zirconium dichloride, racemic and meso ethylenebis(2-cyclohexyldimethylsiloxy-4,5,6,7-tetrahydroindenyl)zirconium dichloride, racemic and meso ethylenebis(2-tert-butyldiphenylsiloxy-4,5,6,7-tetrahydroindenyl)zirconium dichloride and rac-ethylenebis (2-t-hexyldimethylsiloxyindenyl)zirconium dichloride. Titanium or hafnium can be used instead of zirconium in corresponding complexes.

When contacting said support, comprising a solid compound which is one of a pure aluminium oxide, a mixed aluminium oxide, an aluminium salt, a magnesium halide or a $C_1$–$C_8$ alkoxy magnesium halide, with b) said metallocene of the general formula (2), the metallocene is preferably dissolved in a $C_4$–$C_{10}$ hydrocarbon solvent and most preferably in an aromatic hydrocarbon solvent such as toluene. As was said before, the metallocene hydrocarbons solution may also contain an alumoxane. The solution is then contacted with the support, which generally is porous.

It is also advantageous, if the total volume of the solution added to the support is less than the volume required to form a support slurry and, according to one embodiment, equal to or less than the pore volume of the support.

Although the amount of metallocene may very much e.g. due to the structure of the support, according to one embodiment of the present invention, the support is contacted with b) said metallocene of the formula (2) at a molar to weight ratio between the metallocene and the support of between 0.001 to 0.50 mmol/g, more preferably 0.010 to 0.10 mmol/g, most preferably 0.02 to 0.08 mmol/g.

In the present process for the preparation of a supported olefin polymerization catalyst composition, the support is contacted with c) an aluminoxane of the general formulas (3). Formulas (3) are general formulas including not only linear and cyclic compounds, but also aluminoxane compounds of cage and net structures. See e.g. Harlan, et. al., J. Am Chem. Soc., 117, (1995) p. 6466, the aluminoxane structures of which are enclosed by reference to disclose one embodiment of the invention.

The aluminoxane used in the process of the present invention is preferably an aluminoxane (3), wherein said R", and optionally said R'" is a $C_3$–$C_{10}$ alkyl group, more preferably an isopropyl, isobutyl, sec-butyl, tert-butyl, isoamyl, sec-amyl, tert-amyl, isohexyl, sec-hexyl or tert-hexyl group. The most preferred aluminoxane of the formula (3) is preferably an aluminoxane in which $2 \leq n \leq 12$, most preferably $4 \leq n \leq 8$. A suitable aluminoxane of the formula (3) is hexa(isobutylaluminiumoxane). The aluminoxane according to the present invention can be prepared analogously to or by modifying a variety of methods for preparing aluminoxane, non-limiting examples of which are described in U.S. Pat. Nos. 4,665,208, 4,952,540, 5,091,352, 5,206, 199, 5,204,419, 4,874,734, 4,924,018, 4,908,463, 4,968,827, 5,308,815, 5,329,032, 5,248,801, 5,235,081, 5,157,137, 5,103,031, EP-A-0 561 476, EP-B1-0 279 586, EP-A-0 594 218 and WO 94/10180.

It is preferable to contact said support previous to, immediately before, or at the beginning of the olefin polymerization, with c) an aluminoxane of formula (3) dissolved or immersed in a hydrocarbon solvent, most preferably a $C_4$–$C_{12}$ aliphatic hydrocarbon solvent such as hexane. When contacting said support with said organometallic compound of the formula (1), said metallocene of the formula (2), and said aluminoxane of the formula (3), the molar ratio between the aluminoxane aluminium metal and the metallocene transition metal M' in the catalyst composition is preferably between 20 and 500, more preferably 30 and 300 and most preferably between 40 and 200. Even more preferably, said ratio is between 80 and 200.

When preparing a supported olefin polymerization catalyst composition according to the present invention, the contacting product between the support, the organometallic compound of the general formula (1), the metallocene of the general formula (2) and the aluminoxane of the general formula (3) can be subjected to a prepolymerization with at least one olefin such as propylene and/or ethylene. The prepolymerizate is then recovered as said supported olefin polymerization catalyst composition.

In addition to the above described process for the preparation of a supported olefin polymerization catalyst composition, the present invention also relates to a supported olefin polymerization catalyst composition which has been prepared according to said described process. The invention also relates to a process for polymerizing at least one olefin by polymerizing in the presence of a supported olefin polymerization catalyst prepared according to the above described process. In the polymerization (homopolymerization and copolymerization) olefin monomers, such as ethylene, propylene, 1-butylene, isobutylene, 4-methyl-1-pentene, 3-methyl-1-butene, 4,4-dimethyl-1-pentene, vinylcyclohexene and their comonomers, can be used. Dienes and cyclic olefins can also be homo- or copolymerized. These α-olefins and other monomers can be used both in the polymerization and prepolymerization of the claimed supported olefin polymerization catalyst composition.

The polymerization can be a homopolymerization or a copolymerization and it can take place in the gas, slurry or a solution phase. The claimed catalyst composition can also be used in high pressure processes. Said α-olefins can be polymerized together with higher α-olefins in order to modify the properties of the final product. Such higher olefins are 1-hexene, 1-octene, 1-decene, etc.

In the following, the present invention is illustrated by non-limited examples.

EXAMPLES

Example 1

Catalyst Preparation
Alumina Calcination

In the most of the catalysts, the carrier used was Alumina B. Catalyst (by Akzo, calcinated 4 hours at 600° C.).

Trimethylaluminium Treatment of Alumina

In these catalysts, alumina was treated with TMA (trimethylaluminium, 20% in pentane): 3 ml of the TMA solution was added to 1 g of alumina, allowed to react for 2 hours, then 10 ml pentane was added and the compounds were allowed to react further for 30 minutes. Then the excess of pentane was decanted away and this "washing" was repeated 3 times under nitrogen without stirring.

Impregnation of Metallocene Compound

After the TMA treatment, said alumina was treated with the 20 mg of rac-ethylenebis(2-tertbutyldimethylsiloxyindenyl)zirconium dichloride diluted in toluene, allowed to react and dried.

Test Polymerization

Polymerization was carried out in a 2-liter Büchi autoclave in i-butane. The ethylene partial pressure was 5 bar, the temperature was 80° C. and the reaction time was 1 hour. 201 mg of catalyst was fed into the autoclave together with 0.6 ml of 20 w-% HIBAO (=hexaisobutylaluminoxane) giving an Al/Zr-ratio of 60. After 1 h of polymerization the yield of HDPE was 140 g giving an activity of the catalyst of 0.7 kgHDPE/g cat h (=259 kgPE/g Zr h).

Example 2

Catalyst Preparation

Alumina calcination and trimethylalumimuim treatment of alumina See example 1

Impregnation of Metallocene Compound

After TMA treatment, said TMA-treated alumina was further treated with 40 mg of rac-ethylenebis(2-tert-butyldimethysiloxyindenyl)zironium dichloride diluted in 1.5 ml toluene, allowed to react for 2 h and dried under $N_2$ blow for 2 h 30 min.

Test Polymerization

Polymerization was carried out in a 2-liter Büchi autoclave in a i-butane. The ethylene partial pressure was 5 bar, the temperature was 80° C. and the reaction time was 1 hour. 98 mg of catalyst was fed into the autoclave together with 0.3 ml of 20 w-% HIBAO (=hexaisobutylaluminoxane) giving an Al/Zr-ratio of 60. After 1 h of polymerization the yield of HDPE was 219 g giving a catalyst activity of 2.0 kgHDPE/g cat h (=416 kgPE/g Zr h).

Example 3

Catalyst Preparation

Alumina Calcination

In the most of the catalysts, the carrier used was alumina B. Catalyst (by Akzo, calcinated 4 hours at 600° C.).

Trimethylaluminium Treatment of Alumina

In these catalysts, alumina was treated with TMA (trimethylaluminium, 20% in pentane): 50 ml TMA solution was added to 10.14 g of alumina, allowed to react for 2 hours, then 100 ml pentane was added and allowed to react further for 1 h 30 minutes. Then the excess pentane was decanted and this "washing" was repeated 3 times with 100 ml of pentane to remove the unreacted TMA.

Impregnation of Metallocene Compound

After the TMA treatment, the alumina was treated with 401 mg of rac-ethylenebis(2-tert-butyldimethylsiloxyindenyl)zirconium dichloride diluted in 10 ml toluene, allowed to react 30 minutes and dried. After drying the catalyst was washed 6 times with 100 ml of pentane to remove unreacted metallocene.

Test Polymerization

Polymerization was carried out in a 2-liter Büchi autoclave in i-butane. The ethylene partial pressure was 5 bar, the temperature was 80° C. and the reaction time was 1 hour. 104 mg of catalyst was fed to the autoclave together with 0.15 ml of 20 w-% HIBAO (=hexaisobutylaluminoxane) giving an Al/Zr-ratio of 30. After 1 h of polymerization the yield of HDPE was 128 g giving a catalyst activity of 1.2 kgHDPE/g cat h (=240 kgPE/g Zr h).

Example 4

Catalyst Preparation

Catalyst preparation according to Example 3

Test Polymerization

Polymerization was carried out in a 2-liter Büchi autoclave in i-butane. The ethylene partial pressure was 5 bar, the temperature was 80° C. and the reaction time was 1 hour. 100 mg of catalyst was fed into the autoclave together with 0.3 ml of 20 w-% HIBAO (=hexaisobutylaluminoxane) giving an Al/Zr-ratio of 60. After 1 h of polymerization the yield of HDPE was 170 g giving a catalyst activity of 1.6 kgHDPE/g cat h (=320 kgPE/g Zr h).

Example 5

Catalyst Preparation

Catalyst preparation according to Example 3

Test Polymerization

Polymerization was carried out in a 2-liter Büchi autoclave in i-butane. The ethylene partial pressure was 5 bar, the temperature was 80° C. and the reaction time was 1 hour. 99 mg of catalyst was fed into the autoclave together with 0.6 ml of 20 w-% HIBAO (=hexaisobutylaluminoxane) giving an Al/Zr-ratio of 120. After 1 h polymerization the yield of HDPE was 231 g giving a catalyst activity of 2.7 kgHDPE/g cat h (=540 kgPE/g Zr h).

Example 6

Catalyst Preparation

Catalyst preparation according to Example 3

Test Polymerization

Polymerization was carried out in a 2-liter Büchi autoclave in i-butane. The ethylene partial pressure was 5 bar, the temperature was 80° C. and the reaction time was 1 hour. 104 mg of catalyst was fed into the autoclave together with 2.6 ml of 20 w-% HIBAO (=hexaisobutylaluminoxane) giving an Al/Zr-ratio of 520. After 1 h polymerization the yield of HDPE was 238 g giving a catalyst activity of 2.3 kgHDPE/g cat h (=460 kgPE/g Zr h).

Example 7

Catalyst Preparation

Catalyst preparation according to Example 3

Test Polymerization

Polymerization was carried out in a 2-liter Büchi autoclave in i-butane. The ethylene partial pressure was 5 bar, 20 ml of 1-butene was added after 15 min of homopolymerization as a comonomer, the temperature was 80° C. and the reaction time was 1 hour. 109 mg of catalyst was fed into the autoclave together with 0.6 ml of 20 w-% HIBAO (=hexaisobutylaluminoxane) giving an Al/Zr-ratio of 120. After 1 h of polymerization the yield of HDPE was 124 g giving a catalyst activity of 1.14 kgHDPE/g cat h (=230 kgPE/g Zr h).

Polymer Properties

Comonomer content was measured by FT-IR. The polymer was containing 1.5 w-% butene as a comonomer indicating good comonomer response.

Example 8

Catalyst Preparation

Catalyst preparation according to Example 3

Test Polymerization

Polymerization was carried out in a 2-liter Büchi autoclave in i-butane. The ethylene partial pressure was 5 bar, 40 ml of 1-butene was added after 15 min of polymerization as a comonomer, the temperature was 80° C. and the reaction time was 1 hour. 110 mg of catalyst was fed into the autoclave together with 0.6 ml of 20 w-% HIBAO (=hexaisobutylaluminoxane) giving an Al/Zr-ratio of 120. After 1 h of polymerization the yield of HDPE was 124 g giving a catalyst activity of 1.75 kgHDPE/g cat h (=350 kgPE/g Zr h).

Polymer Properties

Comonomer content was measured by FT-IR. The polymer was containing 2.9 w-% butene as a comonomer indicating good comonomer response.

Example 9

Catalyst Preparation

Catalyst preparation according to Example 3

Test Polymerization

Polymerization was carried out in a 2-liter Büchi autoclave in i-butane. The ethylene partial pressure was 5 bar, 60 ml of 1-butene was added after 15 min of polymerization as a comonomer, the temperature was 80° C. and the reaction time was 1 hour. 100 mg of catalyst was fed into the autoclave together with 0.6 ml of 20 w-% HIBAO (=hexaisobutylaluminoxane) giving an Al/Zr-ratio of 120. After 1 h of polymerization the yield of HDPE was 124 g giving a catalyst activity of 1.8 kgHDPE/g cat h (=360 kgPE/g Zr h).

Polymer Properties

Comonomer content was measured by FT-IR. The polymer was containing 4.2 w-% butene as a comonomer indicating good comonomer response.

Example 10

Catalyst Preparation

Catalyst preparation according to Example 3

Test Polymerization

Polymerization was carried out in a 2-liter Büchi autoclave in i-butane. The ethylene partial pressure was 5 bar, 80 ml of 1-butene was added after 15 min of polymerization as a comonomer, the temperature was 80° C. and the reaction time was 1 hour. 92 mg of catalyst was fed into the autoclave together with 0.6 ml of 20 w-% HIBAO (=hexaisobutylaluminoxane) giving an Al/Zr-ratio of 120. After 1 h of polymerization the yield of HDPE was 124 g giving a catalyst activity of 2.2 kgHDPE/g cat h (=440 kgPE/g Zr h).

Polymer Properties

Comonomer content was measured by FT-IR. The polymer was containing 4.6 w-% butene as a comonomer indicating good comonomer response.

Example 11
(Comparative; Using Silica)

Catalyst Preparation

Silica Gel Calcination

The silica used was Sylopol 55 SJ, calcinated for 4 hours at 600° C.

Methylation of Silica Sylopol 55 SJ

Silica was TMA treated identically to alumina. In these catalysts, silica was first treated with TMA (trimethylaluminium, 20% in pentane): 4.5 ml of the TMA solution was added to 1 g of silica, allowed to react for 2 hours, then 10 ml pentane was added and the compounds were allowed to react further for 30 minutes. Then the excess of pentane was decanted away and this "washing" was repeated twice. The mixture was dried under nitrogen for one hour. During this drying process, magnetic stirring was used.

Impregnation of Metallocene Compound

After the TMA treatment, the silica was treated with 20 mg of rac-ethylenebis(2-tert-butyldimethylsiloxyindenyl) zirconium dichloride diluted in 1.5 ml of toluene, allowed to react and dried.

Test Polymerization

Polymerization was carried out in a 2-liter Büchi autoclave in i-butane. The ethylene partial pressure was 5 bar, the temperature was 80° C. and the reaction time was 1 hour. 195 mg of catalyst was fed into the autoclave together with 0.6 ml of 20 w-% HIBAO (=hexaisobutylaluminoxane) giving an Al/Zr-ratio of 120. After 1 h of polymerization the yield of HDPE was 22 g giving a catalyst activity of only 0.1 kgHDPE/g cat h (=40 kgPE/g Zr h).

Example 12
(Comparative; no HIBAO)

Catalyst Preparation

Catalyst preparation as in Example 1

Test Polymerization

Polymerization was carried out in a 2-liter Büchi autoclave in i-butane. The ethylene partial pressure was 5 bar, the temperature was 80° C. and the reaction time was 1 hour. 210 mg of catalyst was fed into the autoclave without any cocatalyst. After 1 h of polymerization the yield of HDPE was 9 g giving a catalyst activity of only 0.04 kgHDPE/g cat h(=16 kgPE/g Zr h).

Example 13
(Comparative; TMA Instead of HEIBAO)

Catalyst Preparation

Catalyst preparation like Example 1

Test Polymerization

Polymerization was carried out in a 2-liter Büchi autoclave in i-butane. The ethylene partial pressure was 5 bar, the temperature was 80° C. and the reaction time was 1 hour. 202 mg of catalyst was fed into the autoclave with 0.3 ml of TMA (=trimethylaluminium 20 w-% in pentane). After 1 h of polymerization the yield of HDPE was 1 g giving a catalyst activity of only 0.01 kgHDPE/g cat h (=2 kgPE/g Zr h).

Example 14
(Comparative; No TMA Treatment)

Catalyst Preparation

Alumina Calcination

In the most of the catalysts, the carrier used was Alumina B. Catalyst (by Akzo, calcinated 4 hours in 600° C.).

Trimethylaluminium Treatment of Alumina No TMA Treatment

Impregnation of Metallocene Compound 1 g alumina was treated with 20 mg of rac-ethylenebis (2-tert-butyldimethylsiloxyindenyl)zirconium dichloride diluted in 1,5 ml toluene, allowed to react for 1 h and dried under N$_2$ for 1 h.

Test Polymerization

Polymerization was carried out in a 2-liter Büchi autoclave in i-butane. The ethylene partial pressure was 5 bar, the temperature was 80° C. and the reaction time was 1 hour. 130 mg of catalyst was fed into the autoclave together with 0.8 ml of 20 w-% HIBAO (=hexaisobutylaluminoxane)

giving an Al/Zr-ratio of 240. After 1 h of polymerization the yield of HDPE was 3 g giving a catalyst activity of 0.02 kgHDPE/g cat h (=9 kgPE/g Zr h).

Example 15
Catalyst Preparation
Silica-Alumina Calcination

In the most of the catalysts, the carrier used was Silica-Alumina where alumina is enriched onto silica surface (by GRACE, calcinated 4 hours in 600° C.).
Trimethylaluminium Treatment of Silica-Alumina In these catalysts, silica-supported alumina was treated with TNLA (trimethylaluminium, 20% in pentane): 50 ml of the TMA solution was added to 10 g of silica-alumina, allowed to react for 2 hours, then 100 ml pentane was added and the compounds were allowed to react further for 1 h 30 minutes. Then the excess of pentane was decanted off and this "washing" was repeated 3 times with 100 ml of pentane to remove unreacted TMA.
Impregnation of Metallocene Compound After the TMA treatment, the alumina was treated with the 400 mg of racethylenebis(2-tert-butyldimethylsiloxyindenyl)zirconium dichloride diluted in 10 ml of toluene, allowed to react 30 minutes and dried. After drying catalyst was washed 6 times with 100 ml of pentane for washing unreacted metallocene compound away.
Test Polymerization Polymerization was carried out in a 2-liter Büchi autoclave in i-butane. The ethylene partial pressure was 5 bar, the temperature was 80° C. and the reaction time was 1 hour. 120 mg of catalyst was fed into the reactor together with 96 ml of 20 w-% HIBAO (=hexaisobutylaluminoxane) giving an Al/Zr-ratio of 120. After 1 h of polymerization the yield of HDPE was 322 g giving a catalyst activity of 2,7 kgHDPE/g cat h (=540 kgPE/g Zr h).

Example 16
Catalyst Preparation
Catalyst Preparation According to Ecample 3.

Test Polymerisation

Polymerization was carried out in a 3-liter Büchi autoclave in a liquid propylene. Propylenepressure was 31 bars, and temperature 70° C. and reaction time was 1 hour. Into reactor 120 mg of catalyst was feeded together with 0,6 ml of 20 w-% HIBAO (=hexaisobutylaluminoxane) giving Al/Zr-ratio 120. After 1 h polymerization the yield of PP was 23,2 g giving activity of catalys 0,2 kgPP/g cat h (=49 kgPE/g Zr h).

Polymer Properties

Xylene soluble fraction was 3 w-% indicating isotacticity index >97%. The molecular weight of polypropylene was Mw=36 000, Mn=17 000 and polydispersity 2.1 indicating single site catalyst behaviour.

In the following table, the parameters and results of the examples are disclosed.

TABLE

| Example | Carrier | Carrier treatment | Cocatalys | Amount of cocatalyst | Zr w - % | $m_{Cat}$ | Yield of polymer (g) | Activity kgPE/g cat × h | Activity kgPE/g Zr × h | butene ml | butene content w - % |
|---|---|---|---|---|---|---|---|---|---|---|---|
| Comparison | Sylopol 55 SJ | metalloce + MAO | No | No | 0.5 | 147 | 147 | 1.0 | 200 | 40 | — |
| 1 | Akzo Alumina B | TMA | HIBAO *) | 0.6 ml | 0.25 | 201 | 140 | 0.7 | 259 | 0 | 0 |
| 2 | " | " | " | " | 0.5 | 98 | 219 | 2.0 | 416 | 0 | 0 |
| 3 | " | " | " | 0.15 ml | 0.5 | 104 | 128 | 1.2 | 240 | 0 | 0 |
| 4 | " | " | " | 0.30 ml | 0.5 | 100 | 170 | 1.6 | 320 | 0 | 0 |
| 5 | " | " | " | 0.60 ml | 0.5 | 99 | 231 | 2.7 | 540 | 0 | 0 |
| 6 | " | " | " | 2.60 ml | 0.5 | 104 | 238 | 2.3 | 460 | 0 | 0 |
| 7 | " | " | " | 0.60 ml | 0.5 | 109 | 124 | 1.14 | 230 | 20 | 1.5 |
| 8 | " | " | " | " | 0.5 | 110 | 193 | 1.75 | 350 | 40 | 2.9 |
| 9 | " | " | " | " | 0.5 | 100 | 180 | 1.8 | 360 | 60 | 4.2 |
| 10 | " | " | " | " | 0.5 | 92 | 203 | 2.2 | 440 | 80 | 4.6 |
| 11 | Sylopol 55SJ | TMA | " | " | 0.25 | 195 | 22 | 0.1 | 40 | 0 | 0 |
| 12 | Akzo Alumina B | TMA | no cocatalyst | — | 0.25 | 210 | 9 | 0.04 | 16 | 0 | 0 |
| 13 | " | TMA | TMA | 0.30 ml | 0.25 | 202 | 1 | 0.01 | 2 | 0 | 0 |
| 14 | Akzo Alumina B | no TMA | HIBAO *) | 0.80 ml | 0.25 | 130 | 3 | 0.02 | 9 | 0 | 0 |
| 15 | Silica-alumina | TMA | HIBAO *) | 0.60 ml | 0.5 | 120 | 322 | 2.7 | 540 | 0 | 0 |
| 16 | Akzo Alumina B | TMA | HIBAO *) | 0.60 | 0.5 | 120 | 23.2 | 0.2 kg PP/g cat × h | 40 kg PP/g × Zr × h | | |

*) HIBAO formula

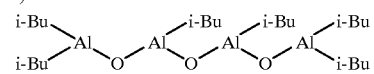

Some conclusions from the examples of this patent application:

1. Effect of the Carrier

From examples 1, 15 and 11 can be seen the effect of alumina structure on the catalyst: When silica is used as a carrier the catalyst activity is very poor (example 11). When alumina (example 1) or silica-alumina (example 15) are used the catalyst activity is improved 20 times (all other components are kept constant).

2. Effect of the TILA (=trimethylaluminium) Treatment of Alumina

From examples 1 and 14 the effect of TMA can be easily seen. When no TMA is used for alumina treatment the catalyst performance is bad (example 14). When TMA treatment is made (example 1) the activity is increased from 0.02 kgPE/g*cat*h up to 0.7 kgPE/g*cat*h. Actually, the catalyst activity increase is 35 times.

3. Effect of the Cocatalyst HIBAO (=hexaisobutylaluminiumoxane)

From examples 1 and 12 the indispensability of the HIBAO can be seen. When no hexaisobutylaluminiumoxane is used, the catalyst activity is very poor being only 0.04 kgPE/g*cat.*h (example 12). The corresponding activity with cocatalyst was 0.7 kgPE/g*cat*h. Actual activity increase in this case is 18 times.

According these claims 1, 2, 3 it is evident that for having active catalyst without MAO as a cocatalyst or coactivator we will need at least all these three components: alumina structure (as a pure alumina or alumina cover like in example 15), TMA-treatment is vital to have catalyst active and finally HIBAO as an external (or internal) cocatalyst.

4. Effect of the Amount of HIBAO as a Cocatalyst

From examples 3, 4, 5, and 6 the effect of amount of HIBAO can be seen. By increasing the amount of HIBAO the catalyst activity is also increased from 1.2 kgPE/g*cat*h up to 2.7 kgPE/g*cat*h by increasing Al/Zr-ratio from 30 up to 120. When enough cocatalyst is introduced into system, no more activity increase can be seen (examples 5 and 6).

5. Incorporation of a Comonomer

Incorporation of a comonomer (butene) has been studied with examples 7, 8, 9, and 10. By increasing comonomer content at polymerization media, the catalyst activity can be increased and comonomer content increased at polymer. The observed activity increase was from 1.14 kg up to 2.2 kgLLD-PE when comonomer content was increased from 20 ml up to 80 ml. Also, the comonomer content at polymer back bone was increased from 1.5 up to 4.6 w-%.

6. Effect of the Amount of Metallocene

From examples 1 and 2 can be seen that by increasing amount of metallocene the catalyst activity was increased from 0.7 kgPE up to 2.0 kgPE when Zr content was increased from 0.25 up to 0.5 w-% accordingly.

What is claimed is:

1. A process for the preparation of a supported olefin polymerization catalyst composition, comprising a support, an organomettalic compound, a metallocene, and an aluminoxane comprising contacting a support comprising a solid compound which is one of pure aluminium oxide, a mixed aluminium oxide, an aluminum salt, a magnesium halide, or a $C_1$–$C_8$ alkoxy magnesium halide, in any order with at least a) an organometallic compound of the general formula (1):

wherein each R is the same or different and is a $C_1$–$C_{10}$ alkyl group; M is a metal of Group 1, 2, 12 or 13 of the Periodic Table; each X is the same or different and one of a halogen atom, a hydrogen atom, a hydroxyl radical or a $C_1$–$C_8$ hydrocarbyloxy group; 1 is 1, 2, or 3; v is the oxidation number of the metal M, b) a metallocene of the general formula (2):

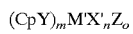

wherein each CpY is the same or different and is one of a mono- or polysubstituted, fused or non-fused, homo- or heterocyclic cyclopentadienyl, indenyl, tetrahydroindenyl, fluorenyl, or octahydrofluorenyl ligand, wherein said ligand is substituted at its cyclopentadienyl ring with at least one substituent Y which is an —OR' radical, each R' being the same or different and being one of a, a tri-$C_1$–$C_8$ hydrocarbylsilyl group or a tri-$C_1$–$C_8$ hydrocarbyloxy silyl group; M' is a transition metal of Group 4 of the Periodic Table and bound to the ligand CpY at least in an η5 bonding mode; each X; is the same or different and is one of a hydrogen atom, a halogen atom, a C1–C8 hydrobarbyl silyl group or two X' form a ring with each other; Z is a bridge atom or group between two CpY ligands or one CpY ligand and the transition metal M'; m is 1 or 2; o is 0 or 1; and n is 4–m if there is no bridge Z or Z is a bridge between two CpY ligands, or n is 4–m–o if Z is a bridge between on CpY ligand and the transition metal M', and c) an aluminoxane of one of the following formulas (3):

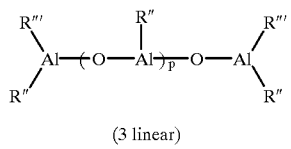

(3 linear)

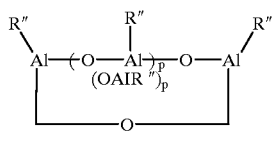

(3 cyclic)

(3 general)

wherein each R" and each R'" is the same or different and is a $C_2$–$C_{10}$ alkyl group; and p is an integer between 1 and 40, and recovering said supported olefin polymerization catalyst composition.

2. The process according to claim 1, further comprising contacting said support at first with a) said organometallic compound of the general formula (1), then with b) said metallocene of the general formula (2), and after that with c) said aluminoxane of the general formula (3).

3. The process according to claim 2, further comprising $a_1$) contacting said support with a solution of said organometallic compound (1), and removing the supernatant from the contacting product, $b_1$) contacting the product of step $a_1$) with a solution of said metallocene (2), and removing the supernatant from the contacting product, $c_1$) contacting the product of step $b_1$) with a solution of said aluminoxane (3), and removing the supernatant from the contacting product, whereby, preferably, the volume of at least one of said solutions is less than at which a slurry is formed.

4. The process according to claim 1, 2 or 3, wherein said solid compound of said support is more acidic than silica.

5. The process according to claim 1, further comprising using a support comprising aluminium oxide which has been heated to a temperature of between 100 and 100° C.

6. The process according to claim 5, wherein the aluminium oxide, is in the form of, or is deposited on, particles having a diameter of between 10 and 500 μm and, independently, having a surface area of between 50 and 600 m²/g.

7. The process according to claim 1, wherein said support is contacted with a liquid comprising a), b) and/or c), the volume of which is less than at which a slurry is formed, preferably less than approximately the volume of the pores of the support.

8. The process according to claim 1, further comprising contacting said support with a) said organometallic compound of the general formula (1), which is one of a $C_1$–$C_{10}$ alkyl lithium, a $C_1$–$C_{10}$ dialkyl magnesium, or a $C_1$–$C_{10}$ trialkyl aluminium.

9. The process according to claim 1, further comprising contacting said support with a) said organometallic compound of the general formula (1) immersed or dissolved in a hydrocarbon medium, preferably a $C_4$–$C_{10}$ hydrocarbon medium.

10. The process according to claim 1, further comprising contacting said support with a) said organometallic compound of the general formula (1) at a weight ratio between the organometallic compound, calculated as trimethylaluminium, and the support of between 0.1 and 10.

11. The process according to claim 1, further comprising contacting said support with b) said metallocene of the general formulas (2), wherein said tri-$C_1$–$C_8$hydrocarbyl silyl group R' of said substituent Y is a tri-$C_1$–$C_8$ hydrocarbyl silyl group capable of a π interaction with said O, S, N, or P atoms of Y, wherein at least one of the $C_1$–$C_8$ alkyls is a branched $C_3$–$C_8$ alkyl.

12. The process according to claim 1, further comprising contacting said support with b) said metallocene of the general formula (2), wherein m is 2, and the two Cp ligands are bridged with each other by a bivalent atom or group Z having at least one chain atom which is one of a carbon, silicon, oxygen, sulphur, nitrogen or phosphorus atom.

13. The process according to claim 1, further comprising contacting said support with b) said metallocene of the general formula (2), wherein M' is Zr.

14. The process according to claim 1, w further comprising contacting said support with b) said metallocene of the general formula (2), wherein X' is a halogen atom and/or a $C_1$–$C_8$ hydrocarbyl group.

15. The process according to claim 1 further comprising contacting said support with b) said metallocene of the general formula (2) which has the following structural formula (4)

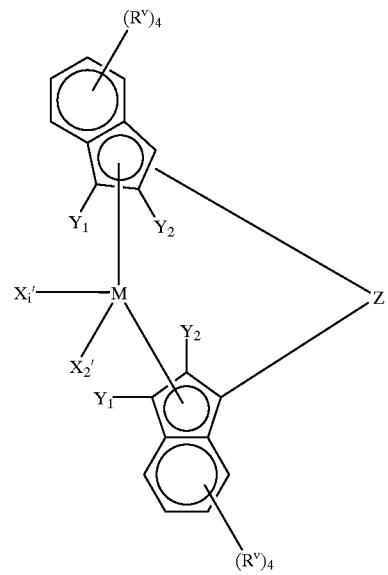

Wherein $Y_1$ and $Y_2$ are the same or different and are one of a hydrogen atom, a halogen atom, an acyl group, an acyloxy group, a $C_1$–$C_{10}$ hydrocarbyl group, a —OR', —SR', —NR', —C(H)═, —C(R')═, or —PR'2 radical, R' being one of a $C_1$–$C_{16}$ hydrocarbyl group or a tri-$C_1$–$C_8$-hydrocarbylsilyl group, provided that at least one of $Y_1$ and $Y_2$ is one of said —OR', —SR', —NR', —C(H)═, —C(R')═, or —PR'2 radicals; Z is a bivalent atom or group having at least one chain atom which is one of a carbon, silicon, oxygen, sulphur, nitrogen, or phosphorus atom; each $R^v$ is the same or different and is one of a hydrogen atom, a halogen atom, a $C_1$–$C_{10}$ hydrocarbyl group, or a $C_1$–$C_{10}$ hydrocarbyloxy group, or ring constituent, M' is one of Ti, Zr or Hf; and X1 and X2 are the same or different and are one of a halogen atom and a C hydrocaryl group.

16. The process according to claims 10–14, further comprising contacting said support with b) said metallocene of the formula (2), said metallocene being ethylen-bis(2-tert-butyldimethylsiloxyindenyl) zirconium dichloride.

17. The process according to claim 1 further comprising contacting said support with b) said metallocene of the formula (2), said metallocene being dissolved in a $C_4$–$C_{10}$ hydrocarbon solvent.

18. The process according to claim 1 further comprising contacting said support with b) said metallocene of the formula (2) at a molar to weight ratio between the metallocene and the support of between 0.001 to 0.50 mmol/g.

19. The process according to claim 1 further comprising contacting said support with c) an aluminoxane of the formulas (3), wherein said R" is a $C_3$–$C_{10}$ alkyl group and, independently, $2 \leq p \leq 12$.

20. The process according to claim 19 further comprising contacting said support with c) an aluminoxane of the formula (3), which is hexa (isobutylaluminiumoxane).

21. The process according to claim 1 further comprising contacting said support previous to, immediately before, or at the beginning of the olefin polymerization, with c) an aluminoxane of the formula (3) dissolved or immersed in a hydrocarbon solvent.

22. The process according to claim 1 further comprising contacting said support with
  a) said organometallic compound of the formula (1), said metallocene of the formula (2), and said aluminoxane of the formula (3), at a molar ratio between the aluminoxane aluminium and the metallocene transition metal M' in the catalyst composition of between 20 and 500.

23. A supported olefin polymerization catalyst composition wherein it has been prepared according to claim 1.

24. A process for polymerizing at least one olefin comprising polymerizing an olefin in the presence of the supported olefin polymerization catalyst composition according to claim 23.

25. The process according to claim 1, wherein said mixed aluminium oxide is alumina-silica.

26. The process according to claim 5, wherein said aluminium oxide is alumina.

27. The process according to claim 6, wherein said aluminium oxide is calcined alumina and said particles have a diameter of between 20 and 200 $\mu$m and, independently, have a surface area of between 100 and 500 $m^2/g$.

28. The process according to claim 8, wherein said trialkyl aluminium is $C_1$–$C_6$ trialkyl aluminium.

29. The process according to claim 8, wherein said trialkyl aluminium is trimethyl aluminium.

30. The process according to claim 9, wherein said hydrocarbon medium is a $C_4$–$C_{10}$ hydrocarbon medium.

31. The process according to claim 10, wherein said weight ratio is between 0.2 and 2.

32. The process according to claim 10, wherein said weight ration is between 0.3 and 1.5.

33. The process according to claim 11, wherein said tri-$C_1$–$C_8$ hydrocabyl silyl group is a tri-$C_1$–$C_8$ alkyl silyl group and said $C_1$–$C_8$ alkyl is selected from the group consisting of isopropyl isobutyl, sec-butyl, tert-butyl, isoamyl, sec-amyl, and tert-amyl.

34. The process according to claim 12, wherein m is 2 and Z is ethylene or silylene.

35. The process according to claim 14, wherein said $C_1$–$C_8$ hydrocarbyl group is chlorine and/or methyl.

36. The process according to claim 15, wherein said Z has 1–4 carbon and/or silicon chain atoms.

37. The process according to claim 17, wherein said solvent is an aromatic hydrocarbon solvent.

38. The process according to claim 17, wherein said solvent is toluene.

39. The process according to claim 18, wherein said ratio is 0.010 to 0.10 mmol/g.

40. The process according to claim 18, wherein said ratio is 0.02 to 0.08 mmol/g.

41. The process according to claim 19, wherein said alkyl group is selected from the group consisting of isopropyl, isobutyl, sec-butyl, tert-butyl, isoamyl, sec-amyl, or tert-amyl group and, independently, $4 \leq p \leq 8$.

42. The process according to claim 21, wherein said solvent is a $C_4$–$C_{12}$ aliphatic hydrocarbon solvent.

43. The process according to claim 21, wherein said solvent is hexane.

44. The process according to claim 22, wherein said ratio is between 30 and 300.

45. The process according to claim 22, wherein said ration is between 40 and 200.

* * * * *